US009514574B2

(12) United States Patent
Reitmayr

(10) Patent No.: US 9,514,574 B2
(45) Date of Patent: Dec. 6, 2016

(54) SYSTEM AND METHOD FOR DETERMINING THE EXTENT OF A PLANE IN AN AUGMENTED REALITY ENVIRONMENT

(71) Applicant: QUALCOMM Incorporated, San Diego, CA (US)

(72) Inventor: Gerhard Reitmayr, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 14/268,721

(22) Filed: May 2, 2014

(65) Prior Publication Data

US 2015/0062117 A1 Mar. 5, 2015

Related U.S. Application Data

(60) Provisional application No. 61/872,436, filed on Aug. 30, 2013.

(51) Int. Cl.
| | |
|---|---|
| *G06T 19/00* | (2011.01) |
| *G06T 7/00* | (2006.01) |
| *G06T 15/00* | (2011.01) |
| *G06K 9/00* | (2006.01) |

(52) U.S. Cl.
CPC ........ *G06T 19/006* (2013.01); *G06K 9/00201* (2013.01); *G06K 9/00624* (2013.01); *G06T 7/0051* (2013.01); *G06T 15/00* (2013.01); *G06T 7/0057* (2013.01); *G06T 2207/10028* (2013.01)

(58) Field of Classification Search
None
See application file for complete search history.

(56) References Cited

U.S. PATENT DOCUMENTS

| | | |
|---|---|---|
| 6,420,698 B1 | 7/2002 | Dimsdale |
| 7,509,241 B2 | 3/2009 | Guo et al. |
| 7,961,934 B2 | 6/2011 | Thrun et al. |

(Continued)

FOREIGN PATENT DOCUMENTS

WO WO-2010049850 A1 5/2010

OTHER PUBLICATIONS

Silberman et al., Indoor Segmentation and Support Inference from RGBD Images, 12th European Conference on Computer Vision, Florence, Italy, Oct. 7-13, 2012. Proceedings, Part V.*
O'Shaughnessy, Brendan, "Depth Sensing Planar Structures: Detection of Office Furniture Configurations" (2012). Electronic Theses and Dissertations. Paper 1747.*

(Continued)

*Primary Examiner* — Carlos Perromat
(74) *Attorney, Agent, or Firm* — Kilpatrick Townsend & Stockton LLP

(57) ABSTRACT

Methods, systems, computer-readable media, and apparatuses for constructing a representation of a planar object are presented. In some embodiments, techniques for constructing a representation of a planar object are disclosed. According to some embodiments, a method for constructing a representation of a planar object may include obtaining a depth image of a physical scene as captured from a viewing position. The depth image may comprise a plurality of depth values and corresponding to a plurality of points in the physical scene. The method may further include identifying a planar surface along which the planar object is estimated to be positioned. Furthermore, the method may include constructing a support map. Moreover, the method may include constructing an occlusion map, the occlusion map indicating portions of the planar surface where the planar object is missing. Subsequently, the method may include constructing a representation of at least one boundary of the planar object, using the occlusion map.

24 Claims, 10 Drawing Sheets

(56) References Cited

U.S. PATENT DOCUMENTS

2010/0315412 A1    12/2010  Sinha et al.
2014/0267610 A1*    9/2014  Ahmad .............. G06K 9/00201
                                                              348/46

OTHER PUBLICATIONS

Richstfeld et al., Segmentation of unknown objects in indoor environments, Intelligent Robots and Systems (IROS), 2012 IEEE/RSJ International Conference on, Oct. 7-12, 2012.*

Reisner-Kollmann I., et al., "Reconstructing shape boundaries with multimodal constraints," Computers & Graphics, vol. 37, 2013, pp. 137-147.

Berger, M-O., "Resolving Occlusion in Augmented Reality: a contour Based Approach without 3D Reconstruction", IEEE Proceedings on Computer Vision and Pattern Recognition, Jun. 17-19, 1997, pp. 91-96.

Breen, David E., et al.,"Interactive Occlusion and Automatic Object Placement for Augmented Reality", Computer Graphics Forum, Wiley Blackwell Publishing Ltd. GB, vol. 15. No. 3., Aug. 26, 1996, 12 pages.

International Search Report and Written Opinion—PCT/US2014/051955—ISA/EPO—Feb. 10, 2015.

Van Krevelen, D.W.F., et al., "A Survey of Augmented Reality Technologies, Applications and Limitations", The International Journal of Virtual Reality, 2010, 9(2), pp. 1-20.

* cited by examiner

SYSTEM AND METHOD FOR DETERMINING THE EXTENT OF A PLANE IN AN AUGMENTED REALITY ENVIRONMENT

This application claims the benefit of U.S. Provisional Application No. 61/872,436, filed Aug. 30, 2013, entitled "SUPPORT AND OCCLUSION MAPS FOR DETERMINING THE EXTENT OF A PLANE" which is incorporated herein by reference.

BACKGROUND

Aspects of the disclosure relate to Augmented Reality (AR). More specifically, aspects of the disclosure relate to constructing support and occlusion maps to determine the extent of a plane in an AR environment.

Augmented reality provides a view of a real-world environment that is augmented with computer-generated virtual objects. In some instances, AR involves the superimposition of virtual objects on a physical environment.

RGB-Depth (RGBD) cameras provide a method to create point clouds that describe the three-dimensional (3D) geometry of a scene. Multiple depth images captured by RGBD cameras can be aligned and combined to create an extensive 3D model of a tabletop surface or a larger room environment.

However, many applications require more than a sampled representation of the scene surface. For example some applications may need to segment the point cloud into subsets that correspond to single objects (e.g., a physical table). For augmented reality applications on mobile devices, the tabletop surface may be an important part of the scene because it defines the area in which the user typically interacts. In order for proper interaction with the defined area, a border associated with the defined area may be required. Current methods may not be able to determine if a border is the true border of the surface or only the border of the recorded data.

Current methods only look at extracting the points that correspond to the single object such as the tabletop surface. Current methods may be able to find a border, but do not decide between the physical border of an object and the border of the reconstruction. This distinction is important for applications, for example games need to know that a surface can grow at the border of the reconstruction, but not at the physical borders of the surface.

Accordingly, a need exists for accurately determining a true border of a surface of an object within an augmented reality environment.

BRIEF SUMMARY

Certain embodiments describe a system and method for constructing a representation of a planar object within an AR environment.

In some embodiments, a method for constructing a representation of a planar object includes obtaining a depth image of a physical scene as captured from a viewing position, the depth image comprising a plurality of depth values and corresponding to a plurality of points in the physical scene, each depth value indicating a distance from the viewing position to one of the plurality of points in the physical scene. The method further includes identifying a planar surface along which the planar object is estimated to be positioned. The method also includes constructing a support map, the support map indicating portions of the planar surface occupied by the planar object and possible surfaces of objects resting on top of the planar object. The method additionally includes constructing an occlusion map, the occlusion map indicating portions of the planar surface where the planar object is missing. The method also includes constructing a representation of at least one boundary of the planar object, using the occlusion map and the support map.

In some embodiments, the planar object is a tabletop in the physical scene.

In some embodiments, the step of constructing the occlusion map includes partitioning the planar surface into a plurality of cells and, for each cell, counting a number of points having depth values large enough to extend from the viewing position and traverse the cell at the planar surface.

In some embodiments, the step of constructing the support map includes partitioning the planar surface into a plurality of cells and, for each cell, counting a number of points having depth values as to extend from the viewing position to the cell or to a location within a vertical column of space above the cell.

In some embodiments, the method further includes constructing an occlusion gradient map based on the occlusion map and the at least one boundary of the planar object. The method additionally includes constructing a support gradient map based on the support map and the at least one boundary of the planar object. The method also includes classifying a segment associated with a boundary of the planar object based on the occlusion gradient map and the support gradient map.

In some embodiments, the step of classifying the segment associated with the boundary of the planar object includes projecting a line segment into the support map, projecting the line segment into the occlusion map, and determining whether the projected line segment coincidences with a true edge of the planar object.

In some embodiments, the depth image is obtained using a RGB depth camera.

In some embodiments, a device for constructing a representation of a planar object includes memory, a camera, and one or more processors. The camera is configured to obtain a depth image of a physical scene as captured from a viewing position, the depth image comprising a plurality of depth values and corresponding to a plurality of points in the physical scene, each depth value indicating a distance from the viewing position to one of the plurality of points in the physical scene. The one or more processors are configured to identify a planar surface along which the planar object is estimated to be positioned, construct a support map, the support map indicating portions of the planar surface occupied by the planar object and possible surfaces of objects resting on top of the planar object, construct an occlusion map, the occlusion map indicating portions of the planar surface where the planar object is missing, and construct a representation of at least one boundary of the planar object, using the occlusion map and the support map.

In some embodiments, one or more non-transitory computer-readable media store computer-executable instructions for constructing a representation of a planar object that, when executed, cause one or more computing devices included in a device to identify a planar surface along which the planar object is estimated to be positioned, construct a support map, the support map indicating portions of the planar surface occupied by the planar object and possible surfaces of objects resting on top of the planar object, construct an occlusion map, the occlusion map indicating portions of the planar surface where the planar object is missing, and construct a representation of at least one boundary of the planar object, using the occlusion map and the support map.

In some embodiments, an apparatus for constructing a representation of a planar object includes means for obtaining a depth image of a physical scene as captured from a viewing position, the depth image comprising a plurality of depth values and corresponding to a plurality of points in the physical scene, each depth value indicating a distance from the viewing position to one of the plurality of points in the physical scene. The apparatus also includes means for identifying a planar surface along which the planar object is estimated to be positioned. The apparatus additionally includes means for constructing a support map, the support map indicating portions of the planar surface occupied by the planar object and possible surfaces of objects resting on top of the planar object. The apparatus further includes means for constructing an occlusion map, the occlusion map indicating portions of the planar surface where the planar object is missing. The apparatus also includes means for constructing a representation of at least one boundary of the planar object, using the occlusion map and the support map.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
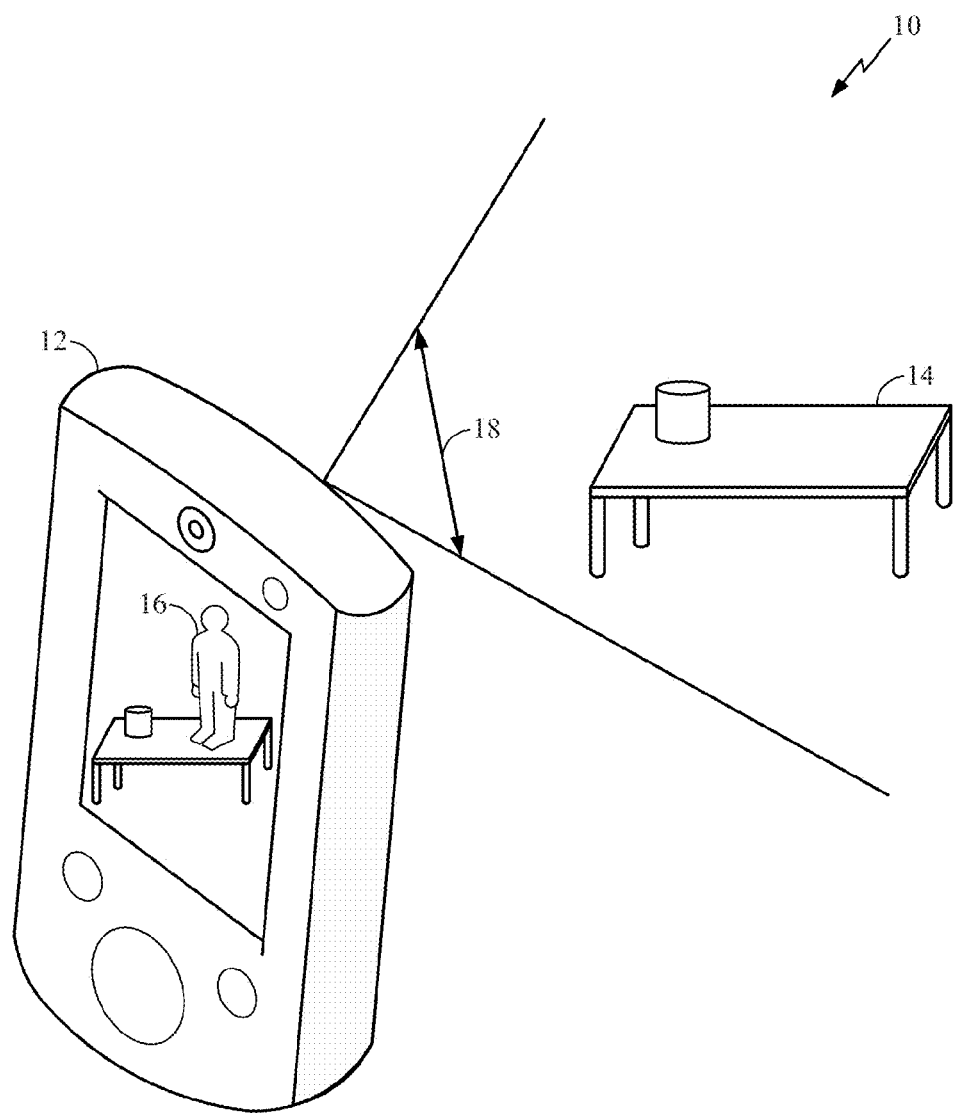
FIG. 1 illustrates a simplified diagram of a system that may incorporate one or more embodiments.

FIG. 1 illustrates a simplified diagram of a system 10 that may incorporate one or more embodiments.

Embodiments of the present invention can describe techniques for determining the extent of a plane (e.g., physical border of an object) within an AR environment. In some instances, the techniques can use two sources of information. First, the techniques may look for possible surface areas of the object (e.g., table surface areas) that are supported by 3D point measurements obtained via an RGBD camera. Secondly, the techniques can eliminate possible surface areas (e.g., table surface areas) that can occlude other 3D point measurements. Combining these two sources of information can allow for the estimation of the true extent of the surface and the determination of a true physical border of the surface.

A point cloud can be created from multiple RGBD images that are aligned in space. A point cloud is a set of data points in a coordinate system and is intended to represent the external surface of the object. In some instances, the positions and orientations of the RGBD can be known within a common reference frame. Subsequently, a 3D point cloud can be created by transforming all the depth maps of the individual RGBD images into the common reference frame. By knowing the position and orientation of the cameras in the common reference frame, the system can have 3D visibility information for each 3D point within the AR environment.

Now referring to FIG. 1, an AR system 10 is illustrated. The AR system 10 includes a device. e.g. an AR-enabled mobile device 12, and an object 14. In this particular example, the object 14 may be a table. The mobile device 12 may be any computing device with an input sensory unit, such as a camera, and a display. Here, the mobile device 12 is a smart phone although the functionality described herein is not limited to smart phones. For example, the mobile device 12 may be a digital camera, a camcorder, a tablet computer, a personal digital assistant, a video game console, a head-mounted display (HMD) or other wearable display, a projector device, an RGBD camera, a depth camera, or other device. Further, instead of the mobile device 12, a device such as a personal computer (e.g., desktop computer), or other non-hand-held device or device not typically labeled a mobile device, could be used. The mobile device 12 includes a camera for capturing images of physical objects in the real-world, physical environment. A viewing position can be from one particular viewpoint (e.g., RGB, depth camera, SONAR, LASER scan) or multiple viewpoints (e.g., stereo camera capable of sensing depth). Additionally, the mobile device 12 can include a plurality of cameras, such as a standalone RGB camera and a standalone depth camera.

As used herein, a point cloud is a collection of points in three-dimensional space corresponding to at least a portion of a physical object that is visible in the field of view 18 by the camera of the mobile device 12. A point cloud may be determined by one or more techniques performed by a processor of the mobile device 12, for example based on image data from the camera (described below) of the mobile device 12. The mobile device 12 is configured to augment reality by capturing images of the physical environment, here capturing images of the object 14 (e.g., table), and displaying the additional imagery on a transparent or semi-transparent display supplemented with one or more virtual objects, here a three-dimensional character 16 is superimposed on the image of object 14 and displayed on a display of the mobile device 12. The three-dimensional character 16 may be any form of virtual object and is not restricted to a humanoid character. The three-dimensional character 16 may be permitted to move to various locations on the surface of the object 14 as detailed herein. Therefore it is important for the AR system 10 to determine the edge of the table. For example, the AR system 10 may want to restrict the movement of the virtual object to be within the table.

As such, the mobile device 12 may determine a true border of a surface of the object 14 using the methods and techniques described in further detail below.

Figure 2A:
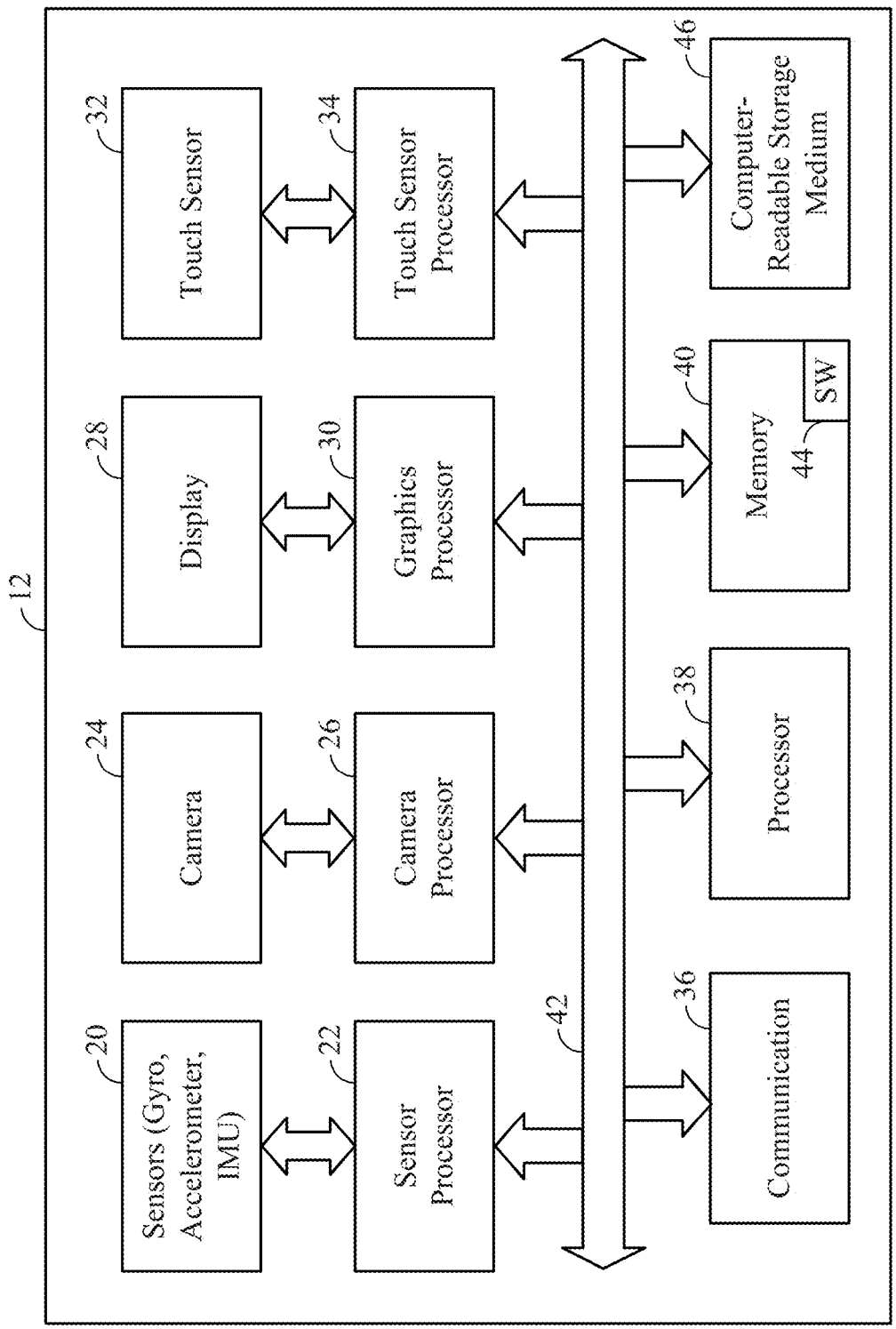
FIG. 2A illustrates an embodiment of the components of a mobile device or some other device configured to construct a representation of a planar object.

FIG. 2A illustrates an embodiment of the components of a mobile device or some other device configured to construct a representation of a planar object.

Referring to FIG. 2A, the mobile device 12 (or other form of AR device) may include sensors 20, a sensor processor 22, one or more cameras 24, a camera processor 26, a display 28, a graphics processor 30, a touch sensor 32, a touch sensor processor 34, a communication module 36, a processor 38, (non-transitory) memory 40, and a computer-readable medium 46. The processors 22, 26, 30, 34, the communication module 36, the processor 38, the memory 40, and the computer-readable medium 46 are communicatively coupled through a bus 42, as illustrated, or may be directly coupled or coupled in another way. The processors 22, 26, 30, 34 may be portions of a single processor, or implemented by different portions of software code stored in the memory 40 and executed by the processor 38, or separate dedicated processors, or combinations of these (e.g., with one or more of the processors 22, 26, 30, 34 being a dedicated processor or processors and others being part of the processor 38). The processors 22, 26, 30, 34, 38 may be one or more general-purpose processors and/or one or more special-purpose processors (such as digital signal processing chips, graphics acceleration processors, and/or the like). The sensors 20 can provide an indication and/or indications of various sensed parameters, e.g., an indication of a direction of gravity, e.g., relative to an orientation of the mobile device 12 (relative to a device coordinate system of the mobile device 12).

The sensors 20 and the sensor processor 22 may be configured to determine an orientation of the mobile device 12. The sensors 20 are orientation sensors configured to sense information for use in determining an orientation of the mobile device 12. For example, the sensors 20 may include one or more inertial sensors such as gyroscopes, one or more accelerometers, an inertial measurement unit (IMU), and/or another type and/or other types of sensors. The sensor processor 22 is configured to process data measured/collected by the sensors 20 to determine the orientation of the mobile device 12. Other information can also be calculated, such as a distance and/or direction mobile device 12 is moved.

The camera(s) 24 and the camera processor 26 are configured to capture and produce visual information. The camera(s) 24 is(are) configured to capture images and/or video of a real-world scene that can be augmented (with augmentation, e.g., text or designs placed on a real-world surface) using augmentation logic. The camera can include a depth camera, an RGB depth camera, SONAR, LASER scan or a stereo camera capable of sensing depth. A depth camera can have different methods for measuring depth. The camera processor 26 is configured to process the data collected by the camera(s) 26 to convert the data into a format that can be used by the augmentation logic. The camera processor 26 is configured to perform various types of image or video processing on the data collected from the camera(s) 24 to prepare the content for display on display 28. A viewing position can be from one particular view point (e.g., depth camera, RGB depth camera, SONAR, LASER scan) or multiple view points (e.g., stereo camera capable of sensing depth).

The display 28 and the graphics processor 30 are configured to provide visual information based on the data captured by the camera(s) 24 and processed by the camera processor 26, and to provide visual information based on information produced by the augmentation logic. The display 28 can be a touch screen interface that includes the touch sensor 32. The graphics processor 30 is configured to generate graphical data for display on the display 28. The graphics processor 30 is configured to use information provided by the augmentation logic to display augmented image or video content.

The touch sensor processor 34 can process data output by the touch sensor 32 to identify when a user touches the touch screen. The touch sensor process 34 can be configured to identify various touch gestures, including multi-finger touches of the touch screen. The augmentation logic can use the gesture information determined by the touch sensor processor 34 to determine, at least in part, how the augmentation should react in response to user input.

The communication module 36 is configured to enable the mobile device 12 to communicate using one or more wireless protocols. The communication module 36 is configured to allow the mobile device 12 to send and receive data from nearby wireless devices, including wireless access points and other AR-enabled devices. The communication module 36 may include a modem, a wireless network card, an infrared communication device, a wireless communication device and/or chipset (such as a short-range wireless device such as a Bluetooth™ device, or an 802.11 device, a WiFi device, a WiMax device, cellular communication facilities, etc.), or the like. The communication module 36 may permit data to be exchanged with a network, other computer systems, and/or other devices.

The processor 38 is configured to control one or more of the sensor processor 22, the camera processor 26, the graphics processor 30, or the touch sensor processor 34. One or more of the sensor processor 22, camera processor 26, the graphics processor 30, or the touch sensor processor 34 may also be implemented by the processor 38.

The memory 40 includes volatile and/or persistent, non-transitory memory for storing data used by various components of the AR-enabled mobile device 12. The memory 40 may include local and/or network accessible storage, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The memory 40 stores processor-readable, processor-executable software program code 44 for one or more of the processors included in the mobile device 12. The software code 44 contains instructions for controlling the processor(s) to perform functions described below (although the description may read that the software or a processor performs the function(s)). In some instances, augmentation logic can be implemented as processor-executable instructions stored in the memory 40. The software 44 includes an operating system, device drivers, executable libraries, and/or other software code instructions, such as one or more application programs, that may implement methods described herein.

For example, one or more procedures described herein might be implemented as software code instructions executed by a processor. Such instructions can cause a general purpose computer (or other device) to perform one or more operations as described herein. The software 44 may be stored on a non-removable portion of the memory 40 incorporated within the mobile device 12 or may be stored on a removable medium, such as a compact disc, and/or provided in an installation package. The instructions may take the form of executable code, which is directly executable by a processor, or alternatively the instructions may take the form of source and/or installable code, which, upon compilation and/or installation (e.g., using any of a variety of generally available compilers, installation programs, compression/decompression utilities, etc.) then takes the form of executable code.

The computer-readable storage medium 46 may be any magnetic, electronic, optical, or other computer-readable storage medium. Computer-readable storage medium 46 may include one or more code modules, described in further detail below.

Figure 2B:
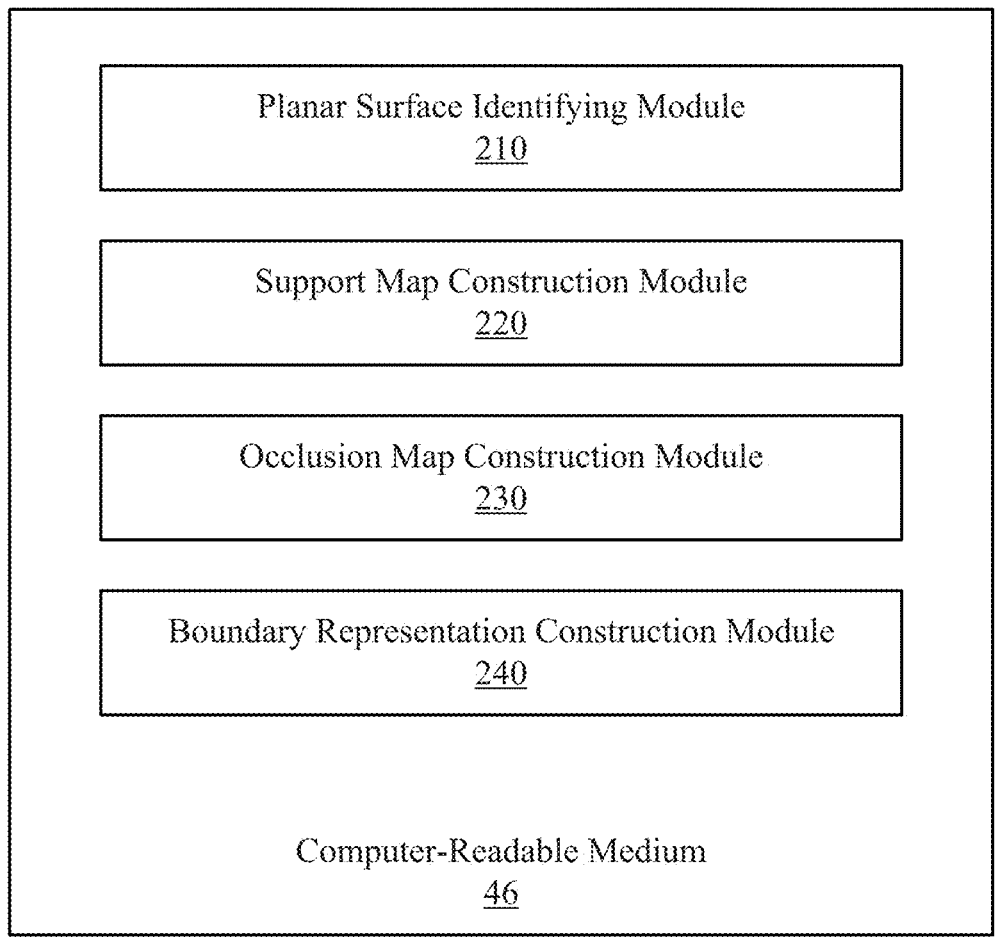
FIG. 2B illustrates a simplified diagram of a computer-readable storage medium that is part of the mobile device.

FIG. 2B illustrates a simplified diagram of a computer-readable storage medium 46 that is part of the mobile device 12. The computer-readable storage medium 46 stores computer-readable code comprising code modules, including planar surface identifying module 210, support map construction module 220, occlusion map construction module 230, and boundary representation construction module 240.

Planar surface identifying module 210 contains code that, when executed by processor 38, identifies a planar surface along which the planar object is estimated to be positioned. The planar surface identifying module 210 may interface with the camera 24 and/or the camera processor 26 to access the captured depth images of the physical scene. Upon accessing the captured depth images of the physical scene, the planar surface identifying module 210 may analyze the images to identify a planar surface within the physical scene. In some embodiments, the identification of the planar surface within the physical scene may be a hypothesis or best guess as to a reference plane in space that the object surface may lie in, as determined by the planar surface identifying module 210. The planar surface within the images of the physical scene may be identified by making use of 3D point measurements. For example, a reference normal direction may be assumed and all 3D points may be projected onto this direction. The peak of the distribution along this direction may be selected since this is the point where most 3D points may lie. In some embodiments, all the 3D points that project into an interval around the peak are selected and a 3D plane is fit robustly to this set. The resulting plane parameters then describe the plane hypothesis for the tabletop surface.

Support map construction module 220 contains code that, when executed by processor 38, constructs a support map indicating portions of the planar surface occupied by the planar object and possible surfaces of objects resting on top of the planar object. The support map construction module 220 may interface with the planar surface identifying module in order to determine where the identified planar surface lies within the physical scene. The support map created by the support map construction module 220 may be defined by a regular 2D grid that spans a part of the 3D plane identified by the planar surface identifying module 210. The map may be a two dimensional matrix of values that stores the number of points for each grid cell that may fall into it. The constructed support map may record which points of the 3D point cloud rest on or above a possible object surface. The support map construction module 220 may project each 3D point along the reference plane into a grid cell. If the point is on or above the reference plane, the support map value corresponding to the particular cell may be incremented. If the point is below the reference plane, no change may be made to any grid cell.

Occlusion map construction module 230 contains code that, when executed by processor 38, constructs an occlusion map indicating portions of the planar surface where the planar object is missing. The occlusion map may record which cells in the 2D grid structure can occlude a 3D point seen by the depth camera. The occlusion map construction module 230 may intersect the ray between each 3D point and the camera center that it was seen from, with the reference plane. A determination may then be made as to which cell the intersection lies in. If the intersection is between the camera center and the 3D point, the occlusion map value corresponding to the particular cell may be incremented, otherwise no change may be made.

Boundary representation construction module 240 contains code that, when executed by processor 38, constructs a representation of at least one boundary of the planar object, using the occlusion map and the support map. The occlusion map may have been generated by the occlusion map construction module 230 and the support map may have been constructed by the support map construction module 220. The boundary representation may be computed for all 3D points associated with the object surface. First, the boundary representation construction module 240 projects all 3D points into the estimated plane, obtaining a set of 2D planar points. Next, the boundary representation construction module 240 computes the convex hull of the point set. Since the convex hull can overestimate the area covered by the point set, the convex hull is iteratively refined by inserting polygon edges that form a concave outline of the 2D planar points. The refinement and construction of the boundary representation is described in further detail below.

One or more of the elements described above with respect to the mobile device 12 may be omitted. For example, the communication module 36 and/or the touch sensor 32 and touch sensor processor 34 may be omitted. Further, additional elements may be included in some embodiments. One or more of the processors 22, 26, 30, 34 may be combined with, or implemented in, the processor 38, and/or some or all functionality of one or more of the processors 22, 26, 30, 34 may be implemented by instructions stored in the memory 40.

Figure 3A:
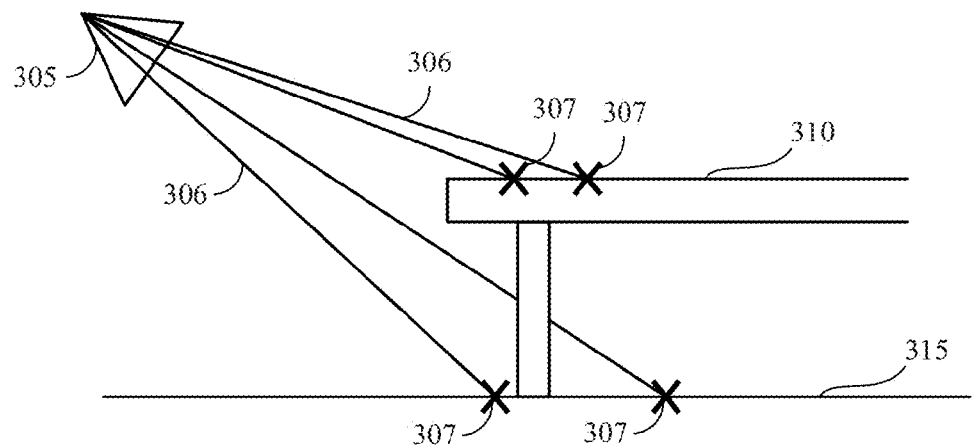
FIG. 3A is an example illustration of a physical scene from which a RGBD camera can capture one or more images and/or other data using 3D points.

FIG. 3A is an example illustration of a physical scene from which a red-green-blue (RGB)-Depth RGBD camera can capture one or more images and/or other data using 3D points. A RGBD camera 305 can observe 3D points both on an object 310 (e.g., a tabletop) and 3D points 307 in the general environment 315 (e.g., the ground underneath the table). As illustrated in FIG. 3A, the 3D visibility information for each 3D point can be based on the direct line of sight 306 between the 3D point 307 and the camera center. Additionally, as illustrated in FIG. 3A, the direct line of sight 306 is not occluded.

Figure 3B:
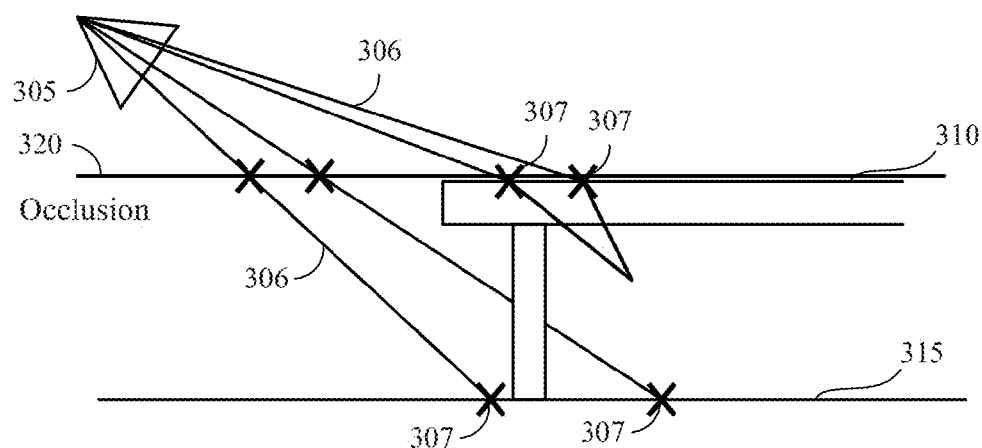
FIG. 3B is an illustration of the physical scene of FIG. 3A, further illustrating a representation of a support surface.

FIG. 3B is an illustration of the physical scene of FIG. 3A, further illustrating a representation of a support surface 320. In some instances, when estimating the tabletop extent and properties, the 3D points 307 can either support part of the table area or be occluded by parts of the table area.

In the next step, the system can define a reference plane corresponding to the support surface 320. For example, the support surface 320 can be the tabletop surface in FIGS. 3A-3B. In some instances, it can be assumed that the support surface 320 has a reference normal direction, and projecting all 3D points onto the direction of the support surface 320. The peak of the distribution along the direction of the support surface 320 can be selected to become the reference plane. The peak of the distribution can be where most of the 3D points lie. Additionally, all 3D points that project into an interval around the peak are selected and a 3D plane is fit robustly to the set of selected 3D points. Therefore, the resulting plane parameters can describe the plane hypothesis for the tabletop surface.

Figure 4A:
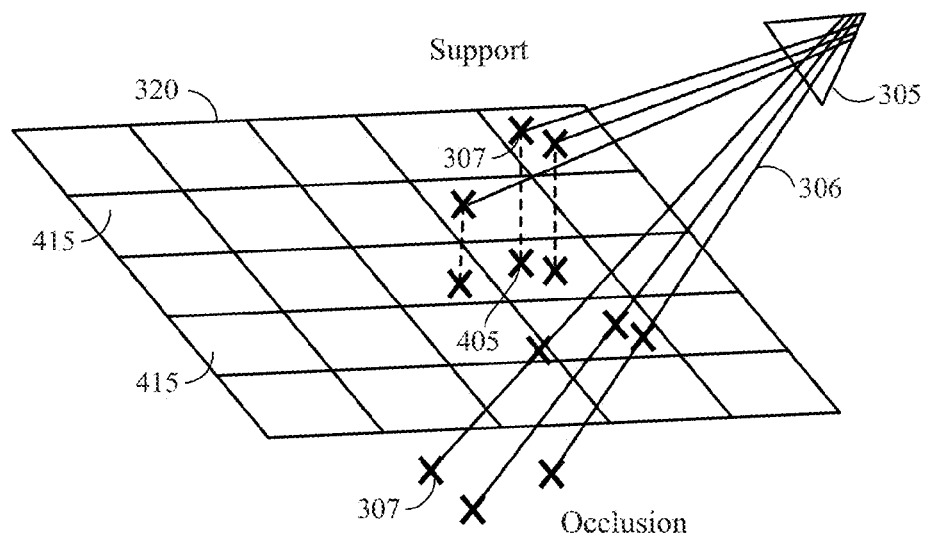
FIG. 4A illustrates a support map, according to some embodiments.
Figure 4B:
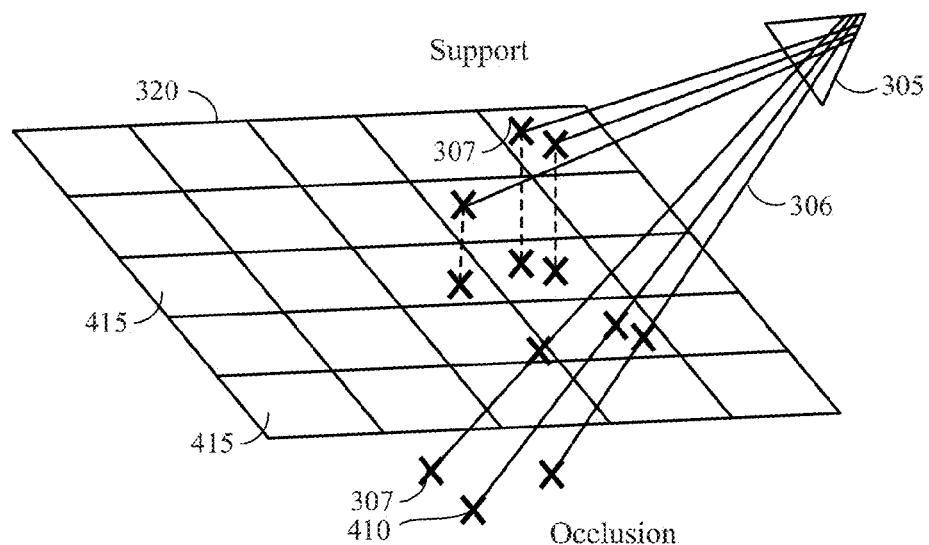
FIG. 4B illustrates an occlusion map, according to some embodiments.

FIGS. 4A and 4B illustrate two maps to record both support and occlusion information for the reference plane, according to some embodiments. The map can be defined by a regular 2D grid that spans a part of the 3D plane at the location of the support surface 320 (e.g., table top surface). A map can be a two dimensional matrix of values that stores the number of points for each grid cell that fall into each grid. The maps may be a support map constructed by the support map construction module 220 and an occlusion map constructed by the occlusion map construction module 230, as described above.

FIG. 4A illustrates a support map, according to some embodiments. The support map can record the points of the 3D point cloud that may be resting on or above the possible support surface 320 (e.g., table surface). For example, to determine the support surface 320, the RGBD camera 305 can project each 3D point 307 along the plane normal into a grid cell 415. If the projected point 307 is on or above the plane (e.g., point 405 in FIG. 4A), then the system may increment the support map value corresponding to that cell. Alternatively, if the projected point is below the plane (e.g., point 410 in FIG. 4B), then the system may ignore the projected point.

FIG. 4B illustrates an occlusion map, according to some embodiments. The occlusion map records which cells 415 in the 2D grid structure occlude 3D points as seen by the camera 305. To determine the occluded 3D points, the system may intersect the ray between each 3D point 307 and the camera 305 center with the plane. Then, the cell 415 that the intersection lies in may be determined. If the intersection is between the camera 305 center and the 3D point, the system can increment the occlusion map value corresponding to the determined cell 415. Alternatively, if the intersection is not in between the 3D point 307 and the camera 305 center, then the system may not increment the occlusion map value.

As illustrated in FIG. 4A, some of the 3D points 307 (e.g., point 405) are projected above the table plane and can be used to increment the support map value corresponding to that cell. Additionally, as illustrated in FIG. 4B, some of the 3D points (e.g., point 410) are projected below the table plane and can be used to increment the occlusion map value corresponding to that cell 415. Rays to 3D points 307 below the plane (e.g. point 410) are intersected with the plane to determine occlusion. Furthermore, the values in the grid cells 415 are updated to count support or occlusion for each 3D point 307.

Figure 5A:
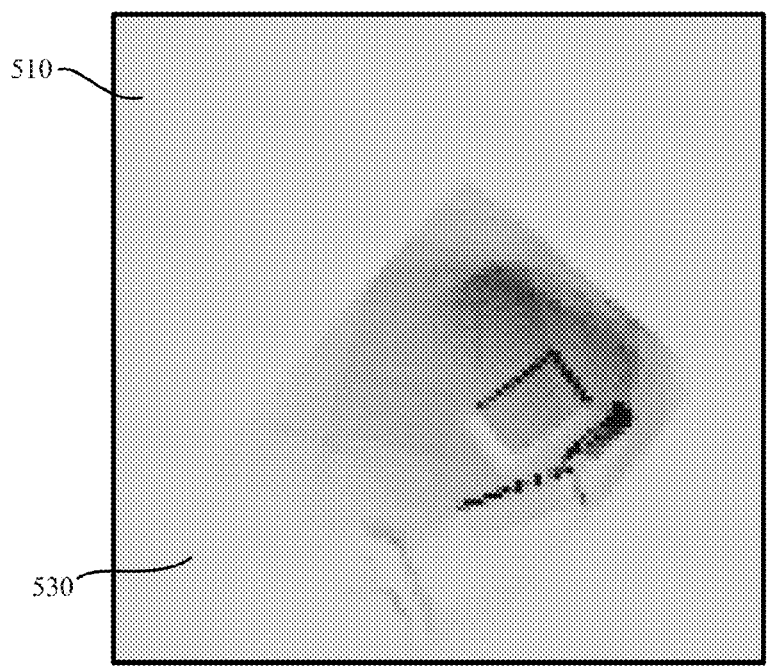
FIG. 5A is an example of a support map rendered as a heat map.
Figure 5B:
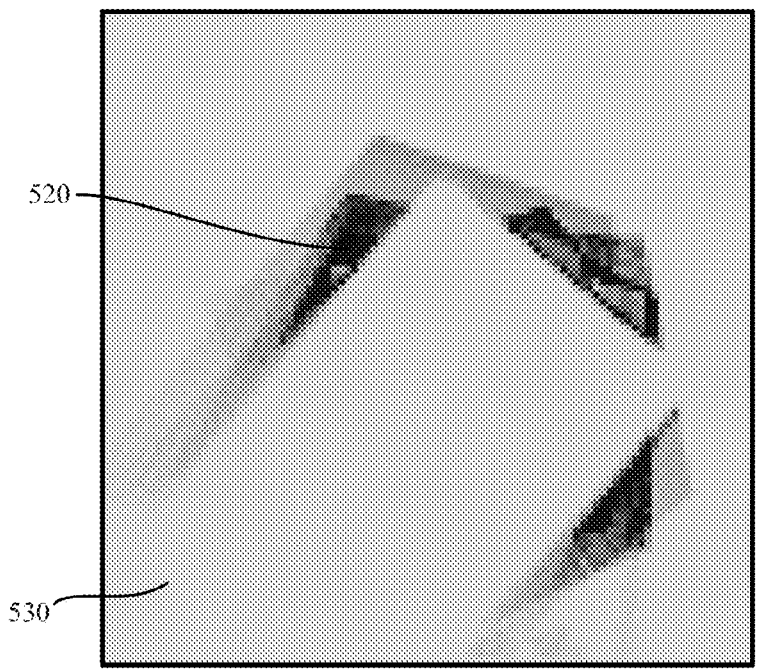
FIG. 5B is an example of an occlusion map rendered as a heat map.

FIGS. 5A and 5B illustrate examples of a support and occlusion heat maps, according to some embodiments.

FIG. 5A is an example of a support map rendered as a heat map. FIG. 5B is an example of an occlusion map rendered as a heat map. In this example, lighter shading 510 indicates low values down to 0, while darker shading 520 indicates high values. In the support map illustrated in FIG. 5A, based on the shading, the system can determine a portion of the rectangular table shape and some objects on top of the table. Additionally, the occlusion map illustrated in FIG. 5B shows the area just beyond the table edges that would occlude other measurements.

In both FIGS. 5A and 5B, the border in the lower left corner region 530 does not have enough information, which can be due from the lack of 3D points in the lower left corner region.

To obtain a representation of the table outline, the system can compute a polygonal outline for all 3D points that have been associated with the table surface. First, the system may project all the 3D points into the estimated plane, obtaining a set of 2D planar points. Then, the system may compute the convex hull of the set of 2D planar points. In some cases, the convex hull may overestimate the area covered by the set of 2D planar points; therefore the system can iteratively refine and reduce the convex hull by inserting polygon edges that form a concave outline of the set of 2D planar points.

For example, the refinement step of the convex hull can look at each polygon segment in turn. The system can compute a circle that intersects the two end points A, B of the polygon segment and a third point C from the 2D point set, for all points in the 2D point set. Then it may determine the 2D point that generates a circle with the largest radius and the center lying on the opposite side of the segment. The theory of alpha shapes then guarantees that no other point lies in that circle. Therefore, the system can replace the original segment with two new segments that connect A to C and C to B. The resulting refined polygon outline may now hug the 2D point set closer than before without leaving out any 2D point.

Figure 6:
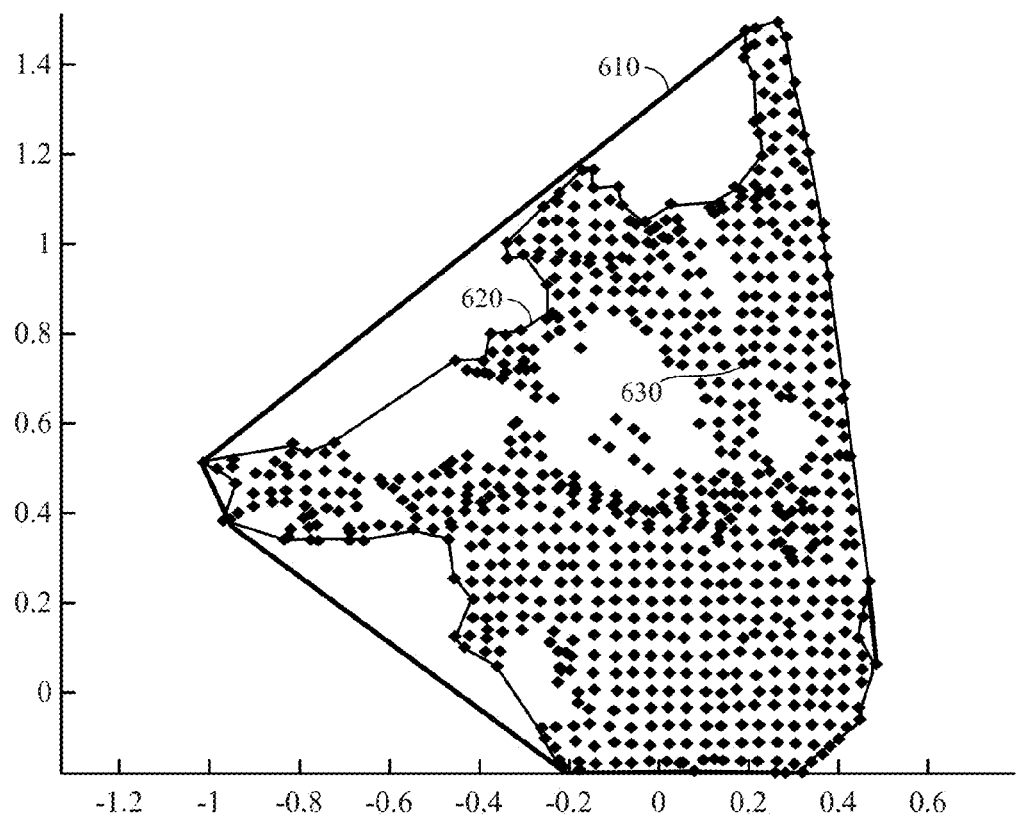
FIG. 6 illustrates the difference between a convex hull and a concave outline computed by a refinement step, according to some embodiments.

FIG. 6 illustrates the difference between the convex hull 610 (thicker line) and the concave outline 620 (thinner line) computed by the refinement step, according to some embodiments. In this example, the input 2D point cloud 630 is illustrated by diamonds. The resulting outline can define a polygon describing the boundary of the current reconstruction of the table, as described above.

To decide which parts of the boundary of the reconstruction coincide with the true object boundary, the system can test the boundary against the support map and the occlusion map constructed in the steps described above.

Figure 7:
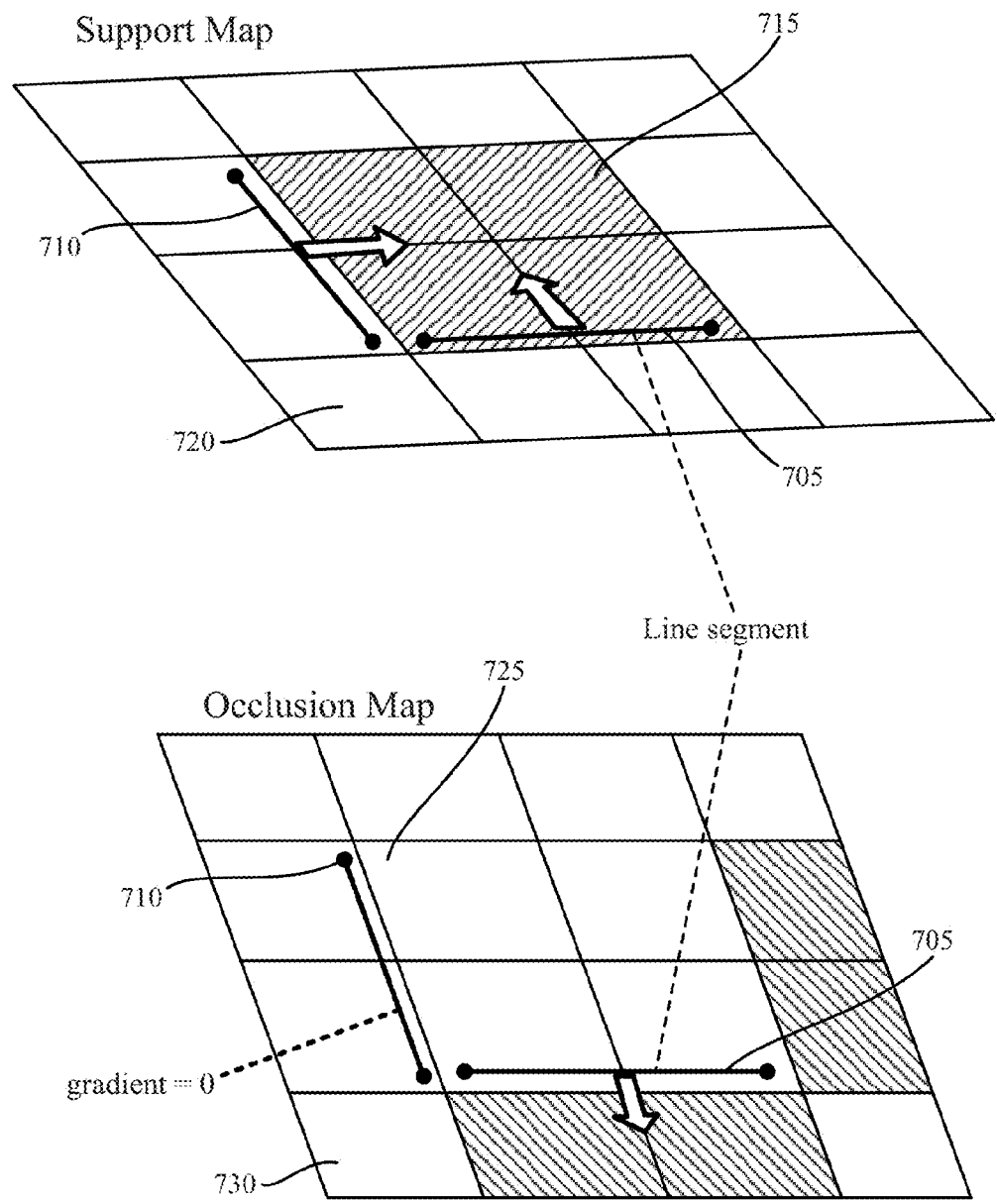
FIG. 7 illustrates a method of categorizing boundary polygon line segments, according to some embodiments.

FIG. 7 illustrates a method of categorizing boundary polygon line segments, according to some embodiments. The line segments (e.g., line segments 705, 710) can be projected into the maps (e.g., the support map and the occlusion map). The local gradients of the two maps (shaded areas) determine whether a line is at a true object boundary or not. In this example, the line segment 710 in the left region is not at a boundary, while the line segment 705 in the lower region is at a boundary. The line segment 705 in the lower region is at a boundary because both gradients are present and point in the right direction.

To determine if the parts of the boundary of the reconstruction coincide with the true object boundary, each line segment (e.g., line segment 705, 710) of the polygon outline is projected into the support map and the occlusion map. If the line segment coincides with a true object edge then the support map should have a high support map value (e.g., medium to dark shading in FIG. 5A) inside 715 of the line segments and a low/zero support map value outside 720 the line segments. Conversely, the occlusion map should have a low/zero occlusion map value inside 725 the line segments because points may not be visible through the object surface. Additionally, the occlusion map should have a high occlusion map value (e.g., medium to dark shading in FIG. 5B) outside 730 the line segments, because there are measured points that would otherwise be occluded.

Both criteria can be tested by integrating the gradients of the support map and the occlusion map along the line segments. The support map gradient can point inwards and be above a certain threshold, while the occlusion map gradient must point outwards and again be above a certain threshold. If both criteria are met, the system can assume that the line segment represents a true object boundary. In any other case, the system may have not gathered enough information; therefore it may be assumed that the boundary is unknown and only an artificial boundary exists at the reconstruction.

Figure 8:
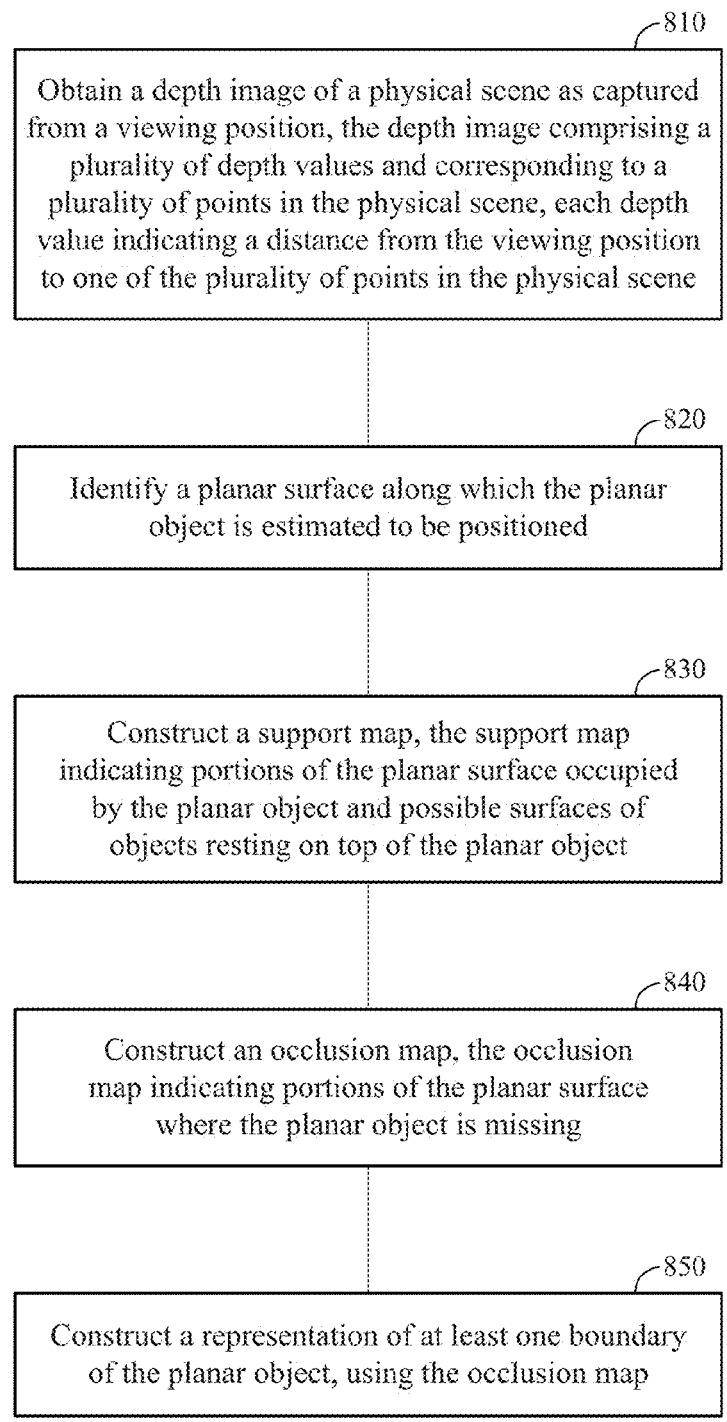
FIG. 8 illustrates an embodiment of a method for constructing a representation of a planar object.

Using the systems and devices of FIGS. 1, 2 and 3, various methods may be performed. FIG. 8 illustrates an embodiment of a method 800 for constructing a representation of a planar object. Method 800 may be performed by the system and/or devices of FIGS. 1, 2A. 2B and 3A, 3B or by some other system configured to present analyze a physical environment. Means for performing the steps of method 800 include one or more instances of the components of systems of FIGS. 1, 2A, 2B and 3A, 3B.

At step 810, the system (e.g., AR system 10, mobile device 12) can obtain a depth image of a physical scene as captured from a viewing position. The depth image can comprise a plurality of depth values and corresponding to a plurality of points in the physical scene. Additionally, each depth value indicating a distance from the viewing position to one of the plurality of points in the physical scene. A viewing position can be from one particular viewpoint (e.g., RGB depth camera, SONAR. LASER scan) or multiple viewpoints (e.g., stereo camera capable of sensing depth). Obtaining a depth image of a physical scene as captured from a viewing position may be performed by camera(s) 24 and one or more of the processes discussed in relation to components 26, 22, 30, 38, and 46 of device 12 in FIG. 2A. Alternatively depth camera 305 may perform step 810.

At step 820, the system (e.g., AR system 10) can identify a planar surface along which the planar object is estimated to be positioned. Identifying a planar surface may be performed by camera(s) 24 and one or more of the processes discussed in relation to components 26, 22, 30, 38, and 46 of device 12 in FIG. 2A. Alternatively depth camera 305 may perform step 810.

At step 830, the system (e.g., AR system 10) can construct a support map. The support map indicating portions of the planar surface occupied by the planar object and possible surfaces of objects resting on top of the planar object. For example, the support map can be constructed using memory 40 and one or more of the processes discussed in relation to components 26, 22, 30, 38, and 46 of device 12 in FIG. 2.

At step 840, the system (e.g., AR system 10) can construct an occlusion map, the occlusion map indicating portions of the planar surface where the planar object is missing. For example, the occlusion map can be constructed using memory 40 and one or more of the processes discussed in relation to components 26, 22, 30 and 38 of device 12 in FIG. 2.

At step 850, the system (e.g., AR system 10) can construct a representation of at least one boundary of the planar object, using the occlusion map. For example, the representation of at least one boundary of the planar object can be construct using memory 40 and one or more of the processes discussed in relation to components 26, 22, 30, 38, and 46 of device 12 in FIG. 2A.

According to some embodiments, the method 800 may further comprise constructing an occlusion gradient map based on the occlusion map and the at least one boundary of the planar object. Additionally, the method 800 may comprise of constructing a support gradient map based on the support map and the at least one boundary of the planar object. Furthermore, the method may comprise classifying a segment associated with a boundary of the planar object based on the occlusion gradient map and the support gradient map.

Furthermore, the step of constructing the support map may comprise of partitioning the planar surface into a plurality of cells. Moreover, for each cell, counting a number of points having depth values as to extend from the viewing position to the cell or to a location within a vertical column of space above the cell.

In one or more arrangement, the planar object can be a tabletop in the physical scene.

In one or more arrangement, the step of constructing the occlusion map may comprise of partitioning the planar surface into a plurality of cells. Additionally, for each cell, counting a number of points having depth values large enough to extend from the viewing position and traverse the cell at the planar surface.

In one or more arrangement, the step of constructing the representation may comprise of projecting a line segment into the support map, projecting the line segment into the occlusion map, and determining whether the projected line segment coincides with a true edge of the planar object.

Figure 9:
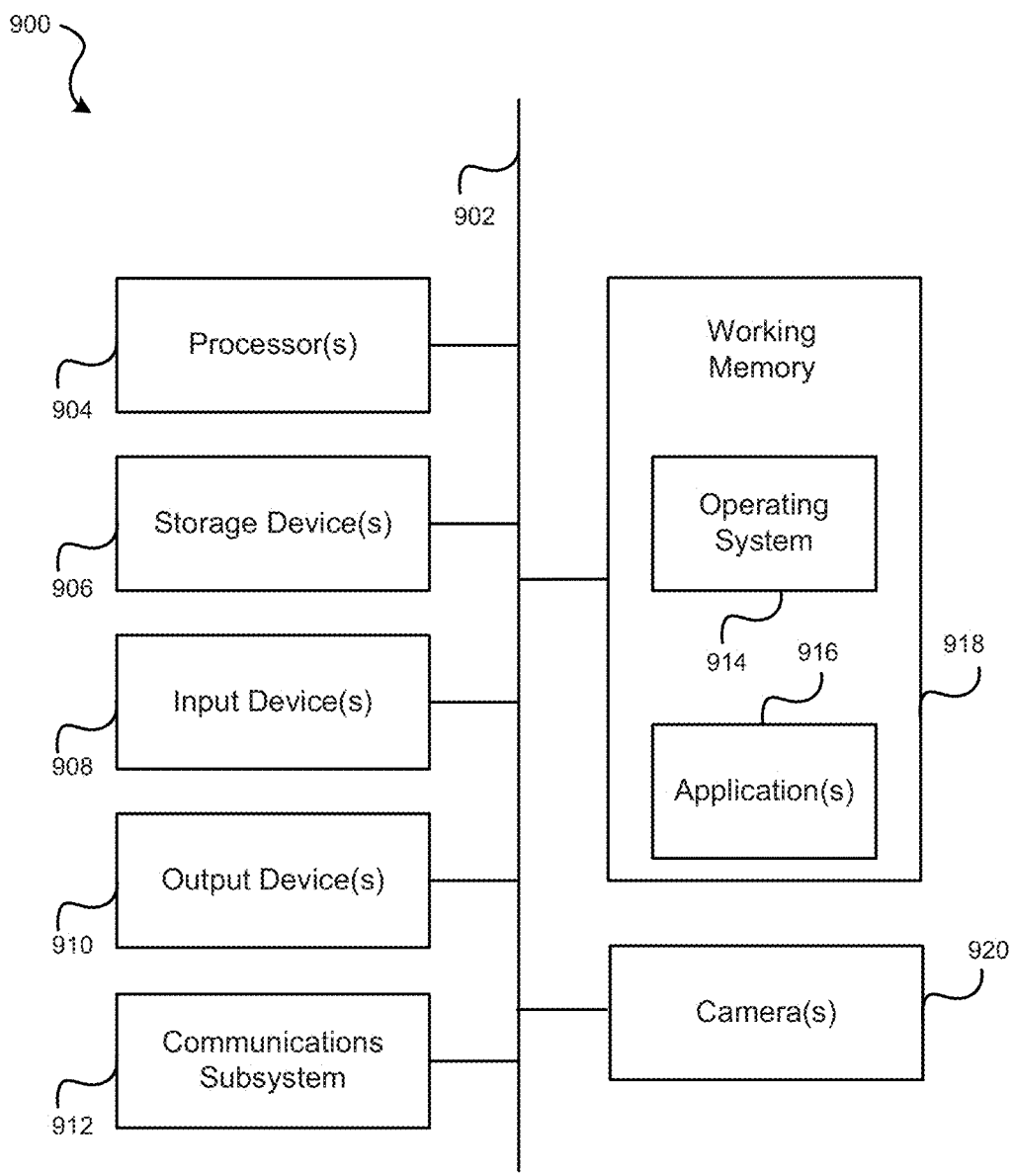
FIG. 9 illustrates an example of a computing system in which one or more embodiments may be implemented.

FIG. 9 illustrates an example of a computing system in which one or more embodiments may be implemented. A computer system as illustrated in FIG. 9 may be incorporated as part of the above described computerized device. For example, computer system 900 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 9 provides a schematic illustration of one embodiment of a computer system 900 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 9 is meant only to provide a generalized illustration of various components, any or all of which may be utilized as appropriate. FIG. 9, therefore, broadly illustrates how individual system elements may be implemented in a relatively separated or relatively more integrated manner. In some embodiments, elements computer system 900 may be used to implement functionality of device 12 in FIG. 1.

The computer system 900 is shown comprising hardware elements that can be electrically coupled via a bus 902 (or may otherwise be in communication, as appropriate). The hardware elements may include one or more processors 904, including without limitation one or more general-purpose processors and/or one or more special-purpose processors (such as digital signal processing chips, graphics acceleration processors, and/or the like); one or more input devices 908, which can include without limitation one or more cameras, sensors, a mouse, a keyboard, a microphone configured to detect ultrasound or other sounds, and/or the like; and one or more output devices 910, which can include without limitation a display unit such as the device used in embodiments of the invention, a printer and/or the like.

In some implementations of the embodiments of the invention, various input devices 908 and output devices 910 may be embedded into interfaces such as display devices, tables, floors, walls, and window screens. Furthermore, input devices 908 and output devices 910 coupled to the processors may form multi-dimensional tracking systems.

The computer system 900 may further include (and/or be in communication with) one or more non-transitory storage devices 906, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 900 might also include a communications subsystem 912, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 912 may permit data to be exchanged with a network, other computer systems, and/or any other devices described herein. In many embodiments, the computer system 900 will further comprise a non-transitory working memory 918, which can include a RAM or ROM device, as described above.

The computer system 900 also can comprise software elements, shown as being currently located within the working memory 918, including an operating system 914, device drivers, executable libraries, and/or other code, such as one or more application programs 916, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 906 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 900 may be omitted or may be implemented separate from the illustrated system. For example, the processor 904 and/or other elements may be implemented separate from the input device 908. In one embodiment, the processor is configured to receive images from one or more cameras that are separately implemented. In some embodiments, elements in addition to those illustrated in FIG. 9 may be included in the computer system 900.

Some embodiments may employ a computer system (such as the computer system 900) to perform methods in accordance with the disclosure. For example, some or all of the procedures of the described methods may be performed by the computer system 900 in response to processor 904 executing one or more sequences of one or more instructions (which might be incorporated into the operating system 914 and/or other code, such as an application program 916) contained in the working memory 918. Such instructions may be read into the working memory 918 from another computer-readable medium, such as one or more of the storage device(s) 906. Merely by way of example, execution of the sequences of instructions contained in the working memory 918 might cause the processor(s) 904 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 900, various computer-readable media might be involved in providing instructions/code to processor(s) 904 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 906. Volatile media include, without limitation, dynamic memory, such as the working memory 918. Transmission media include, without limitation, coaxial cables, copper wire and fiber optics, including the wires that comprise the bus 902, as well as the various components of the communications subsystem 912 (and/or the media by which the communications subsystem 912 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 904 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 912 (and/or components thereof) generally will receive the signals, and the bus 902 then might carry the signals (and/or the data, instructions, etc. carried by the signals) to the working memory 918, from which the processor(s) 904 retrieves and executes the instructions. The instructions received by the working memory 918 may optionally be stored on a non-transitory storage device 906 either before or after execution by the processor(s) 904.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for constructing a representation of a planar object comprising:
    obtaining a depth image of a physical scene as captured from a viewing position, the depth image comprising a plurality of depth values and corresponding to a plurality of points in the physical scene, each depth value indicating a distance from the viewing position to one of the plurality of points in the physical scene;
    identifying a planar surface along which the planar object is estimated to be positioned;
    constructing a support map, the support map indicating portions of the planar surface occupied by the planar object and possible surfaces of objects resting on top of the planar object;
    constructing an occlusion map, the occlusion map indicating portions of the planar surface where the planar object is missing;
    testing a boundary of the planar surface using the occlusion map and the support map;
    constructing a boundary of the planar surface based on the testing;
    constructing a representation of at least one boundary of the planar object, using the occlusion map and the support map;
    constructing an occlusion gradient map based on the occlusion map and the at least one boundary of the planar object;
    constructing a support gradient map based on the support map and the at least one boundary of the planar object; and
    classifying a segment associated with a boundary of the planar object based on the occlusion gradient map and the support gradient map.

2. The method of claim 1 wherein the planar object is a table top in the physical scene.

3. The method of claim 1 wherein constructing the occlusion map comprises:
    partitioning the planar surface into a plurality of cells; and
    for each cell, counting a number of points having depth values large enough to extend from the viewing position and traverse the cell at the planar surface.

4. The method of claim 1 wherein constructing the support map comprises:
    partitioning the planar surface into a plurality of cells; and
    for each cell, counting a number of points having depth values as to extend from the viewing position to the cell or to a location within a vertical column of space above the cell.

5. The method of claim 1 wherein classifying the segment associated with the boundary of the planar object comprises:
    projecting a line segment into the support map;
    projecting the line segment into the occlusion map; and
    determining whether the projected line segment coincidences with a true edge of the planar object.

6. The method of claim 1 wherein the depth image is obtained using a RGB depth camera.

7. A device for constructing a representation of a planar object comprising:
    memory;
    a camera to obtain a depth image of a physical scene as captured from a viewing position, the depth image comprising a plurality of depth values and corresponding to a plurality of points in the physical scene, each depth value indicating a distance from the viewing position to one of the plurality of points in the physical scene; and one or more processors configured to:
  identify a planar surface along which the planar object is estimated to be positioned;
  construct a support map, the support map indicating portions of the planar surface occupied by the planar object and possible surfaces of objects resting on top of the planar object;
  construct an occlusion map, the occlusion map indicating portions of the planar surface where the planar object is missing;
  test a boundary of the planar surface using the occlusion map and the support map;
  construct a boundary of the planar surface based on the testing;
  construct a representation of at least one boundary of the planar object, using the occlusion map and the support map;
  construct an occlusion gradient map based on the occlusion map and the at least one boundary of the planar object;
  construct a support gradient map based on the support map and the at least one boundary of the planar object; and
  classify a segment associated with a boundary of the planar object based on the occlusion gradient map and the support gradient map.

8. The device of claim 7 wherein the planar object is a table top in the physical scene.

9. The device of claim 7 wherein constructing the occlusion map comprises:
  partitioning the planar surface into a plurality of cells; and
  for each cell, counting a number of points having depth values large enough to extend from the viewing position and traverse the cell at the planar surface.

10. The device of claim 7 wherein constructing the support map comprises:
  partitioning the planar surface into a plurality of cells; and
  for each cell, counting a number of points having depth values as to extend from the viewing position to the cell or to a location within a vertical column of space above the cell.

11. The device of claim 7 wherein classifying the segment associated with the boundary of the planar object comprises:
  projecting a line segment into the support map;
  projecting the line segment into the occlusion map; and
  determining whether the projected line segment coincidences with a true edge of the planar object.

12. The device of claim 7 wherein the camera is a RGB depth camera.

13. One or more non-transitory computer-readable media storing computer-executable instructions for constructing a representation of a planar object that, when executed, cause one or more computing devices included in a device to:
  obtain a depth image of a physical scene as captured from a viewing position, the depth image comprising a plurality of depth values and corresponding to a plurality of points in the physical scene, each depth value indicating a distance from the viewing position to one of the plurality of points in the physical scene;
  identify a planar surface along which the planar object is estimated to be positioned;
  construct a support map, the support map indicating portions of the planar surface occupied by the planar object and possible surfaces of objects resting on top of the planar object;
  construct an occlusion map, the occlusion map indicating portions of the planar surface where the planar object is missing;
  test a boundary of the planar surface using the occlusion map and the support map;
  construct a boundary of the planar surface based on the testing;
  construct a representation of at least one boundary of the planar object, using the occlusion map and the support map;
  construct an occlusion gradient map based on the occlusion map and the at least one boundary of the planar object;
  construct a support gradient map based on the support map and the at least one boundary of the planar object; and
  classify a segment associated with a boundary of the planar object based on the occlusion gradient map and the support gradient map.

14. The non-transitory computer-readable media of claim 13 wherein the planar object is a table top in the physical scene.

15. The non-transitory computer-readable media of claim 13 wherein constructing the occlusion map comprises:
  partitioning the planar surface into a plurality of cells; and
  for each cell, counting a number of points having depth values large enough to extend from the viewing position and traverse the cell at the planar surface.

16. The non-transitory computer-readable media of claim 13 wherein constructing the support map comprises:
  partitioning the planar surface into a plurality of cells; and
  for each cell, counting a number of points having depth values as to extend from the viewing position to the cell or to a location within a vertical column of space above the cell.

17. The non-transitory computer-readable media of claim 13 wherein classifying the segment associated with the boundary of the planar object comprises:
  projecting a line segment into the support map;
  projecting the line segment into the occlusion map; and
  determining whether the projected line segment coincidences with a true edge of the planar object.

18. The non-transitory computer-readable media of claim 13 wherein the depth image is obtained using a RGB depth camera.

19. An apparatus for constructing a representation of a planar object comprising:
  means for obtaining a depth image of a physical scene as captured from a viewing position, the depth image comprising a plurality of depth values and corresponding to a plurality of points in the physical scene, each depth value indicating a distance from the viewing position to one of the plurality of points in the physical scene;
  means for identifying a planar surface along which the planar object is estimated to be positioned;
  means for constructing a support map, the support map indicating portions of the planar surface occupied by the planar object and possible surfaces of objects resting on top of the planar object;
  means for constructing an occlusion map, the occlusion map indicating portions of the planar surface where the planar object is missing;

means for testing a boundary of the planar surface using the occlusion map and the support map;

means for constructing a boundary of the planar surface based on the testing;

means for constructing a representation of at least one boundary of the planar object, using the occlusion map and the support map;

means for constructing an occlusion gradient map based on the occlusion map and the at least one boundary of the planar object;

means for constructing a support gradient map based on the support map and the at least one boundary of the planar object; and means for classifying a segment associated with a boundary of the planar object based on the occlusion gradient map and the support gradient map.

20. The apparatus of claim 19 wherein the planar object is a table top in the physical scene.

21. The apparatus of claim 19 wherein constructing the occlusion map comprises:

means for partitioning the planar surface into a plurality of cells; and for each cell, counting a number of points having depth values large enough to extend from the viewing position and traverse the cell at the planar surface.

22. The apparatus of claim 19 wherein constructing the support map comprises:

means for partitioning the planar surface into a plurality of cells; and for each cell, counting a number of points having depth values as to extend from the viewing position to the cell or to a location within a vertical column of space above the cell.

23. The apparatus of claim 19 wherein classifying the segment associated with the boundary of the planar object comprises:

projecting a line segment into the support map;

projecting the line segment into the occlusion map; and determining whether the projected line segment coincidences with a true edge of the planar object.

24. The apparatus of claim 19 wherein the depth image is obtained using a RGB depth camera.

* * * * *